E. M. BABLE.
NUT LOCK.
APPLICATION FILED OCT. 15, 1921.
1,418,050.
Patented May 30, 1922.
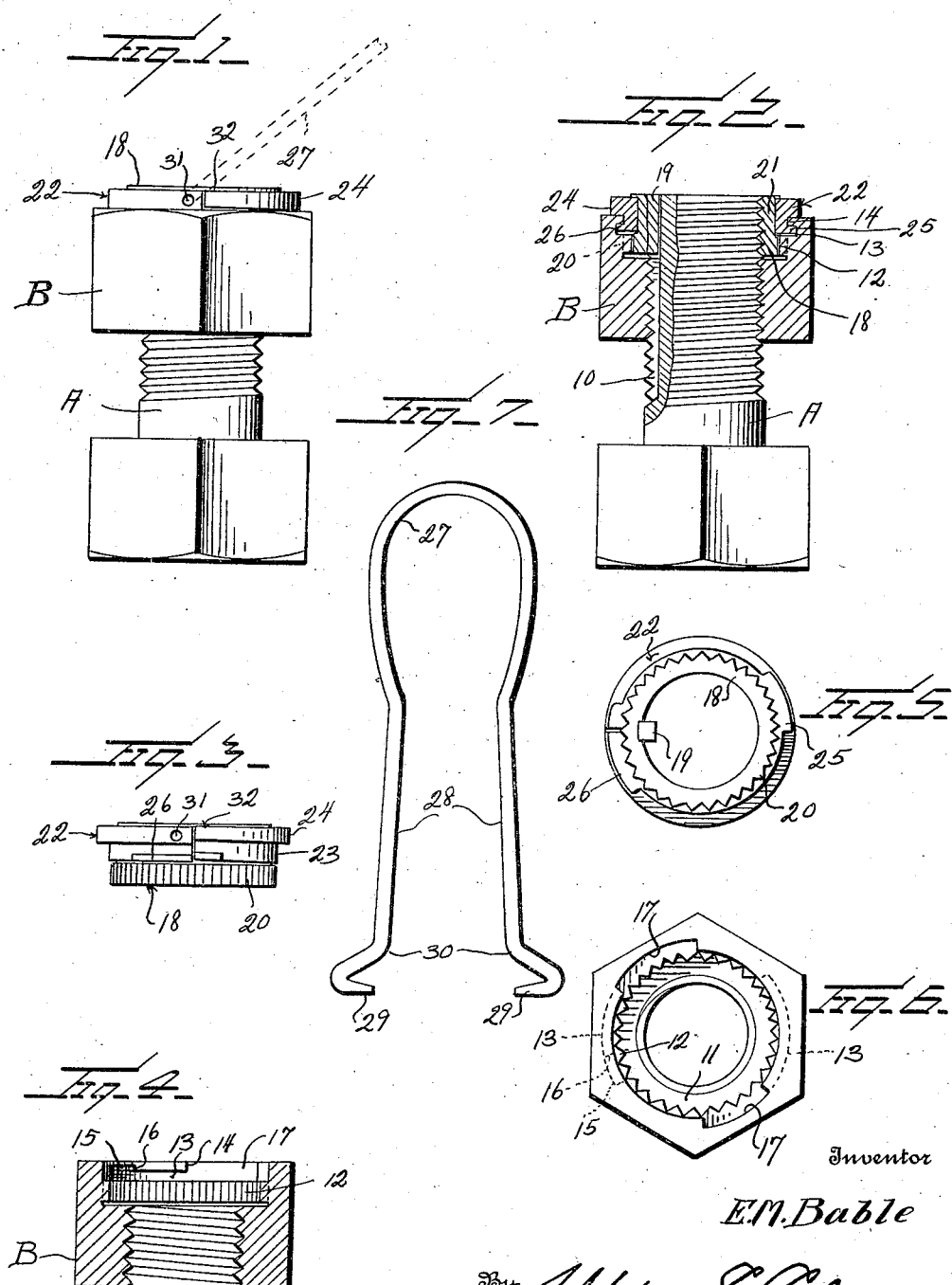
Inventor
E. M. Bable
By Watson E. Coleman
Attorney

UNITED STATES PATENT OFFICE.

EDWARD MILTON BABLE, OF SISTERSVILLE, WEST VIRGINIA, ASSIGNOR OF ONE-HALF TO TECUMSEH S. HANES, OF KANAUGA, OHIO.

NUT LOCK.

1,418,050.   Specification of Letters Patent.   Patented May 30, 1922.

Application filed October 15, 1921. Serial No. 507,980.

*To all whom it may concern:*

Be it known that I, EDWARD MILTON BABLE, a citizen of the United States, residing at Sistersville, in the county of Tyler and State of West Virginia, have invented certain new and useful Improvements in Nut Locks, of which the following is a specification, reference being had to the accompanying drawings.

This invention relates to nut locks, particularly to the type of coupled nut and bolt, and has for its object the provision of a novel and improved nut lock including a separable member adapted to interlock with both the bolt and the nut for holding the nut against movement with respect to the bolt.

An important object is the provision of a nut lock in which the separable locking member is itself of peculiar formation whereby when turned to operative position it will automatically lock itself with respect to the nut, as well as the bolt, so that casual displacement will be absolutely prevented and that a specially constructed tool is necessary to effect disengagement of the separable member prior to the unscrewing of the nut.

An additional object is the provision of a nut lock of this character which will be simple and inexpensive in manufacture, highly efficient in use, positive in holding action, durable in service and a general improvement in the art.

With the above and other objects and advantages in view, the invention consists in the details of construction to be hereinafter more fully described and claimed, and illustrated in the accompanying drawings, in which:

Figure 1 is a side elevation of my improved nut lock;

Figure 2 is a longitudinal sectional view therethrough, a portion of the bolt being in elevation;

Figure 3 is a side elevation of the locking member;

Figure 4 is a sectional view through the nut alone;

Figure 5 is a bottom plan view of the locking member;

Figure 6 is a face view of the nut; and

Figure 7 is a detail view of the releasing and locking tool.

Referring more particularly to the drawings, the letter A designates a bolt and B designates a nut threaded thereon. In carrying out my invention the entire threaded portion of the bolt is formed with a longitudinal groove or key way 10 and the nut has its outer face formed with a circular recess 11 near the base of which is provided a series of teeth 12 formed on the wall of the recess. Between the teeth and the face of the nut the wall of the recess is formed with peripheral grooves 13 overhung by flanges 14 and at one end of one groove 13 the overhanging flange thereof is formed with a recess 15 defining a shoulder 16. Both overhanging flanges 14 are cut away at one end, as indicated at 17, the cut away portion extending to the base of the groove 13.

In order to lock the nut with respect to the bolt, I provide a locking member which consists of a ring 18 having a smooth bore of sufficient diameter that it may pass over the bolt, and projecting from the inner periphery of the bore is a key 19 engaging within the groove 10 in the bolt. The outer periphery of the ring 18 is formed with teeth 20 cooperating with the teeth 12 in the nut. The ring 18 is formed with a reduced extension 21 upon which is rotatably mounted a split spring ring 22 which is held associated with the ring 18 by slightly upsetting the end of the latter. The spring ring 22 does not have all points in its outer flat face lying in the same plane, or in other words, it is of slightly spiral formation. This ring has a reduced extension 23 which fits within the untoothed portion of the nut recess 11 and the formation of this reduced extension 23 forms an outwardly extending flange 24 which seats upon the outer face of the nut B. Formed upon the reduced extension 23 at a point opposite the split is a projection 25 while formed on the diametrically opposite portion is a similar projection 26 which extends across the split. Owing to the fact that the split ring is of somewhat spiral formation, it will be apparent that one end of the projection 26 will lie in a different plane from the remainder thereof, as clearly shown in one of the detail views.

In assembling the nut lock, the nut B is of course first screwed upon the bolt A to the desired position. The separable locking member is then associated with the bolt and nut, the key 19 being engaged within the groove 10 in the bolt and the teeth 20 engaging with the teeth 12. It is then necessary to rotate the split ring 22 until the projections 25 and 26 upon the reduced extention 23 thereof come into registration with the cut away portions 17 at the entrance to the nut recess 11. These projections will then slip through the cut away portions so that when the split ring is subsequently rotated in a counter clockwise direction the projections 25 and 26 will ride within the grooves 13. At the end of the rotary movement the small offset end of the projection 26 will snap into the recess 15 under cut in the flange 14 so that retrograde rotation of the spring ring will be impossible. It is then apparent that the nut and bolt will be securely locked together so that rotation of the nut will be absolutely impossible, and this, of course, provides an extremely positive and secure lock.

When it is desired to release the locking device so that the nut may be unscrewed, it is necessary to make use of a specially constructed tool such as that illustrated in one of the figures of the drawing wherein a tool is shown as consisting of a handle 27 having spaced arms 28 terminating in inwardly directed lugs 29. Adjacent the lugs the arms 28 are formed with heels 30. It should be stated that the flange portion 24 of the split ring is provided adjacent the split and at a diametrically opposite point with holes 31. In order to effect removal of the nut, it is necessary to engage the lugs 29 of the tool within the holes 31 and then swing the tool to bring one of the heels 30 into engagement with the outwardly sprung part of the ring 22, this point being indicated by the numeral 32. When pressure is applied to the tool this sprung portion of the ring will be forced into alignment with the remainder of the ring so that the portion of the projection 26 engaged within the recess 15 will be withdrawn from the latter out of engagement with the shoulder 16 so that the operator may then turn the ring 22 in a clockwise direction to bring the projections 25 and 26 into registration with the cut away portions 17 whereupon the entire locking member may be lifted out of association with the nut and the bolt.

From the foregoing description and a study of the drawings it will be apparent that I have thus provided a highly efficient and positively acting nut lock which couples together the bolt and the nut, the locking structure being furthermore of peculiar formation and mounting and having such association with the nut as to prevent its displacement from its locking position except by use of a specially constructed tool. Casual displacement is thus prevented and all attempts at tampering with the mechanism will be frustrated.

While I have shown and described the preferred embodiment of the invention, it is of course to be readily understood that I reserve the right to make such changes in the form, construction and arrangement of parts as will not depart from the spirit of the invention or the scope of the sub-joined claims.

Having thus described my invention, I claim:

1. In combination with a bolt having a groove extending longitudinally thereof, a nut coacting with the bolt and having the outer end portion of its bore enlarged to define a recess, said recess being provided with an annular series of teeth, the wall of the recess being formed outwardly of said teeth with peripheral grooves leading at one end into cut away portions extending to the face of the nut, a locking member insertible within said recess and including a ring adapted to embrace the bolt and formed with a key fitting within said groove in the bolt, said ring being formed with a series of teeth meshing with the teeth within said recess, and a split ring permanently and revolubly associated with said ring and formed with a reduced portion received within said recess and provided with outwardly extending projections received within said cut away portions whereby upon subsequent rotation of the split ring said projections will be received within said grooves in the nut.

2. In combination with a bolt having a groove extending longitudinally thereof, a nut coacting with the bolt and having the outer end portion of its bore enlarged to define a recess, said recess being provided with an annular series of teeth, the wall of the recess being formed outwardly of said teeth with peripheral grooves leading at one end into cut away portions extending to the face of the nut, a locking member insertible within said recess and including a ring adapted to embrace the bolt and formed with a key fitting within said groove in the bolt, said ring being formed with a series of teeth meshing with the teeth within said recess, and a split ring permanently and revolubly associated with said ring and formed with a reduced extension received within said recess and provided with outwardly extending projections received within said cut away portions whereby upon subsequent rotation of the split ring said projections will be received within said grooves in the nut, said split ring being of spiral formation with the split intersecting one of said projections whereby one end of said intersected projection will lie in a plane different from the plane of the remainder thereof, one of the grooves in the nut being formed with a recess receiving said end of said intersected projection to form a lock preventing rotation of the split ring.

3. In combination with a bolt having a groove extending longitudinally thereof, a nut coacting with the bolt and having the outer end portion of its bore enlarged to define a recess, said recess being provided with an annular series of teeth, the wall of the recess being formed outwardly of said teeth with peripheral grooves leading at one end into cut away portions extending to the face of the nut, a locking member insertible within said recess and including a ring adapted to embrace the bolt and formed with a key fitting within said groove in the bolt, said ring being formed with a series of teeth meshing with the teeth within said recess, and a split ring permanently and revolubly associated with said ring and formed with a reduced extension received within said recess and provided with outwardly extending projections received within said cut away portions whereby upon subsequent rotation of the split ring said projections will be received within said grooves in the nut, said split ring being of spiral formation with the split intersecting one of said projections whereby one end of said intersected projection will lie in a plane different from the plane of the remainder thereof, one of the grooves in the nut being formed with a recess receiving said end of said intersected projection to form a lock preventing rotation of the split ring, in combination with means engageable with the split ring at one side of the split thereof for forcing said end of said intersected projection into alignment with the remainder thereof for preventing reverse rotation of the split ring to effect removal of the locking member from the nut and bolt.

In testimony whereof I hereunto affix my signature.

EDWARD MILTON BABLE.